Oct. 21, 1969

E. N. SINGER 3,474,235

PULSE PERCENT INDICATOR

Filed March 9, 1966

INVENTOR.
EDWARD N. SINGER

BY Ernest J. Weinberger

ATTORNEYS

Oct. 21, 1969  E. N. SINGER  3,474,235
PULSE PERCENT INDICATOR
Filed March 9, 1966  3 Sheets-Sheet 2

INVENTOR.
EDWARD N. SINGER
BY Ernest J Weinberger
ATTORNEYS

Oct. 21, 1969

E. N. SINGER 3,474,235

PULSE PERCENT INDICATOR

Filed March 9, 1966

INVENTOR.
EDWARD N. SINGER
BY Ernest J. Weinberger
ATTORNEYS

United States Patent Office

3,474,235
Patented Oct. 21, 1969

3,474,235
PULSE PERCENT INDICATOR
Edward N. Singer, Jamaica, N.Y., assignor to the United States of America as represented by the Secretary of the Navy
Filed Mar. 9, 1966, Ser. No. 534,988
Int. Cl. G06f 7/38; G06g 7/00; H04b 1/00
U.S. Cl. 235—92                                      10 Claims

ABSTRACT OF THE DISCLOSURE

An apparatus for measuring the proportion of input pulses exceeding a selectable amplitude wherein a 100 pulse counter feeds a flip-flop whose output in turn applied to one input of an "and" circuit. The other "and" input is derived from a variable level discriminator. Both the discriminator and the counter receive the pulses which are to be proportioned. The output of the "and" circuit is counted to provide the selected proportion.

---

Figure 1:
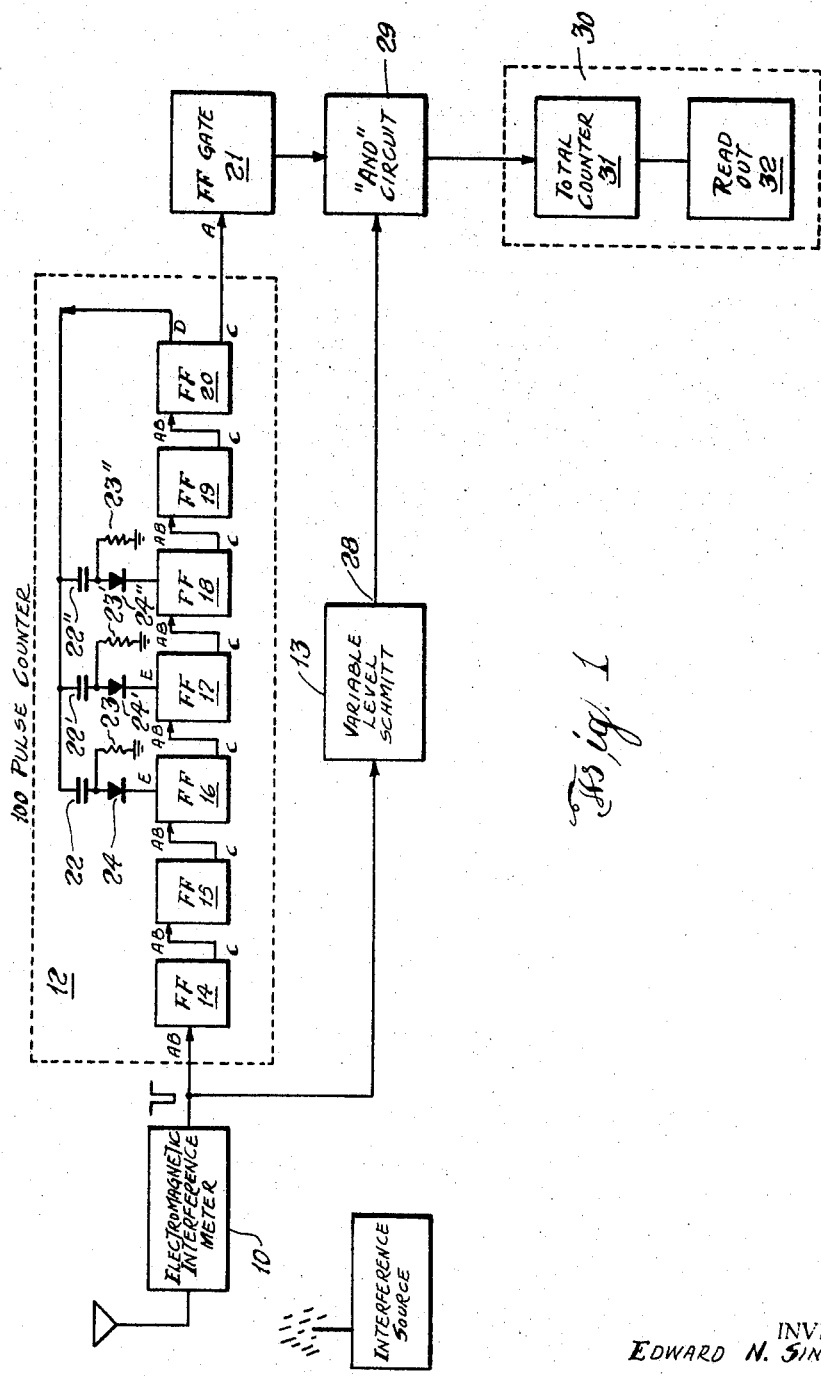

The invention described herein may be manufactured and used by or for the Government of the United States of America for governmental purposes without the payment of any royalties thereon or therefor.

This invention relates to indicators in general and more particularly to special indicators of the type that readout a percentage of pulses, events or inputs that exceed a selectable amplitude or level.

Prior devices of this type have generally employed statistical methods for ascertaining relative proportions of events. In the field of electromagnetic measurements and more particularly in the measurement of radio interference it is necessary to ascertain the number of interfering noise pulses that exceed some selectable amplitude. Rado interference noise pulses from electric and electronic switches or from any other sources might result in malfunction of critical and sensitive equipment, such as, computers, navigation and communication devices. It is common knowledge that noise pulses vary extensively in amplitude and repetition rate. Present methods of accomplishing such measurements are restricted to simplifying the determination of the amplitude of the greatest pulse during a specified time period. Thus it cannot be ascertained how many pulses during any one period exceeded some relative amplitude nor how many had attained the highest amplitude. Thus if only one or 100 pulses reached the limit the indication would be the same. This type of data is entirely unsatisfactory and without informational value.

Another form of measurement has been employed in order to attempt to overcome the above deficiencies. In this case a resistor-capacitor circuit having a specific rapid time charge constant and a relatively slow time discharge constant is employed with a suitable detector. The small charge and large discharge time constants enable the quasi-peak value of the noise to be measured, but, there is still lacking therein, the number of pulses that have occurred during the period of measurement. For comparison or correlation purposes both of the aforementioned measurements are of some value but as an absolute determination both are entirely unsatisfactory.

With the recent advent of extremely versatile computers electromagnetic interference measurement data analysis has become a distinct possibility. The data link or conversion from the measuring instrument to the computer must be such as to supply both a noise amplitude distribution and the pulse repetition rate. Present techniques and equipment are not capable of supplying this necessary data form and it is therefore an object of this invention to provide a simple, reliable and relatively inexpensive device and method which will indicate the number of noise or other types of pulses which exceed in amplitude a selected value, for a specific number of total pulses.

Another object of this invention is to provide a device for the measurement of the percent of pulse events exceeding in amplitude some set value and an indication of the number of total pulse events during a specific time period or repetition rate.

Other objects and advantages will appear from the following description of an example of the invention, and the novel features will be particularly pointed out in the appended claims.

Figure 2:
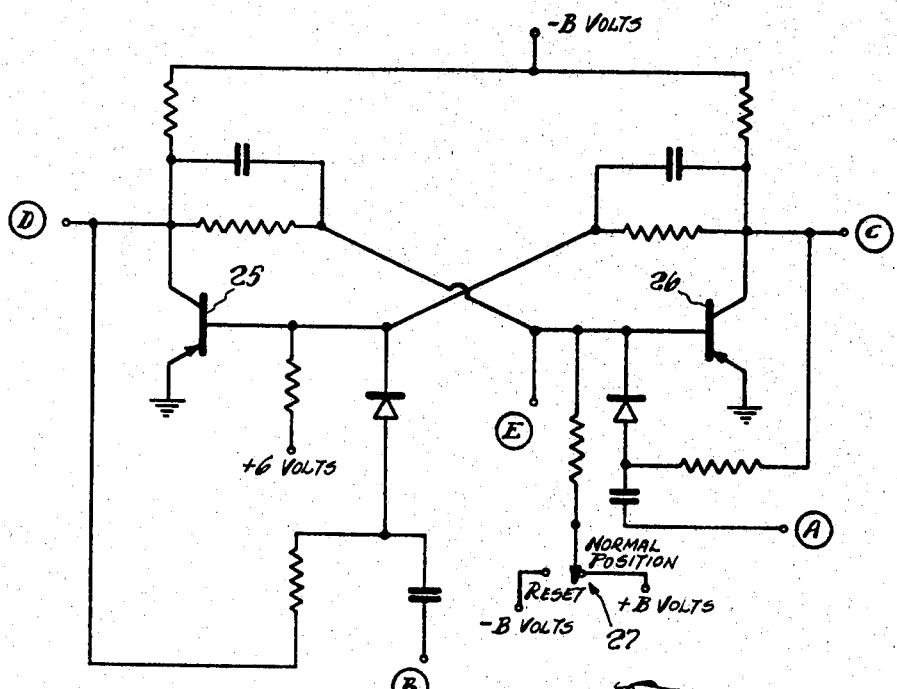
Figure 3:
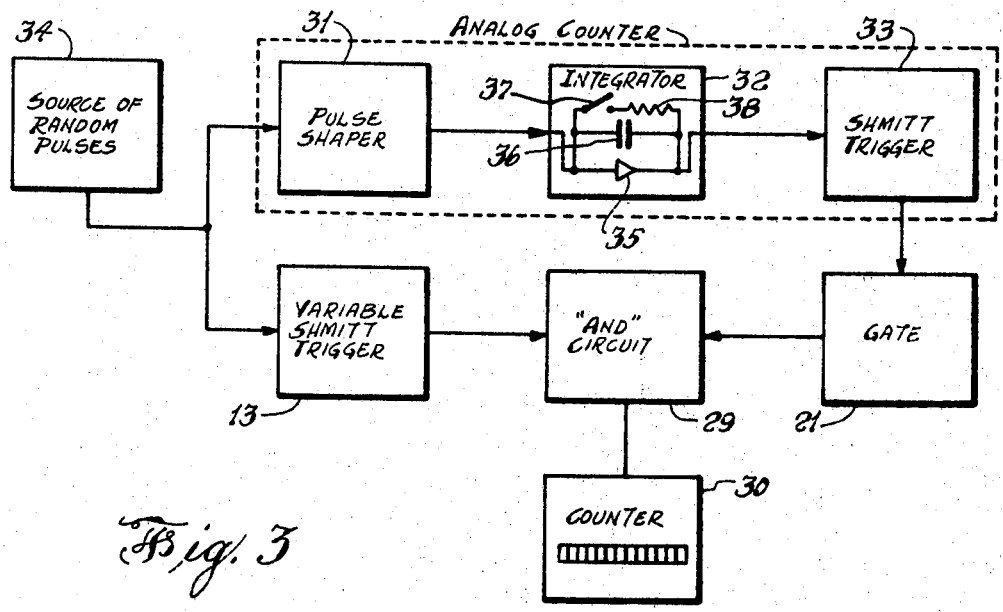
Figure 4:
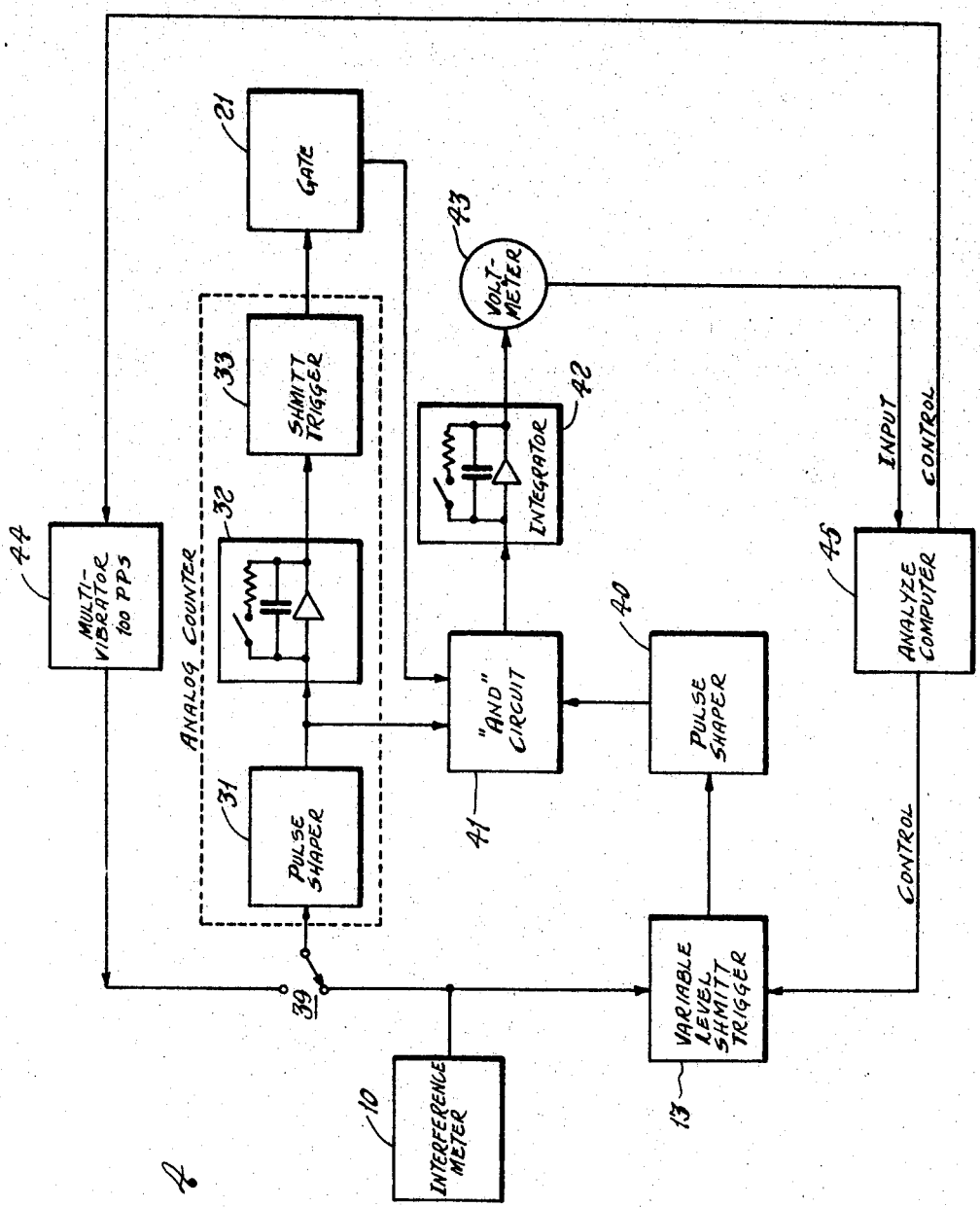

In the accompanying drawings:

FIG. 1 is a block diagram of a digital embodiment made in accordance with the principles of this invention, FIG. 2 is a schematic diagram of one flip-flop circuit which may be employed in the counter circuit, FIG. 3 is a block diagram of an embodiment employing analog elements made in accordance with the principles of this invention and FIG. 4 is still another embodiment made in accordance with the principles of this invention and employing both analog and digital circuitry.

In the embodiment of the invention illustrated in FIG. 1 an electromagnetic interference detection or measuring device 10, such as a standard radio interference meter, provides a pulse or noise output corresponding to the noise or interference generated by some source. The source as shown radiates (such as a switch light etc.) interference and this radiation is picked up by the meter 10 antenna. The same results occur in the case of conducted or line interference except that the antenna is not necessary for the detection. The pulse output 11 of the meter 10 is simultaneously applied to a pulse counter 12 and a variable level Schmitt trigger circuit 13. Generally a pulse counter comprises a plurality of series connected bistable elements such as flip-flops 14 through 20. The arrangement, although others can be employed, has three separate feedback loops so that the output of the last flip-flop 20 is also applied to the "E" inputs of elements 16, 17 and 18. This is necessitated by the fact that this counter is preset to count to "100," which constitutes a convenient integer as will be seen hereinafter. With other feedback circuitry different total counts may be obtained.

The seven flip-flops would normally provide a total count of 128 but with the feedback to the third, fourth and fifth elements a subtraction results. The third subtracts $2^2$ or 4, the fourth $2^3$ or 8 and the fifth $2^4$ or 16 which together total 28 thus leaving a final count of "100." The 100th pulse provides an output at terminal C of bistable element 20 which output turns the gate 21 off or to the "0" state. Gate 21 is a flip-flop similar to those of the counter 12. The capacitor 22 and resistor 23 in each of the feedback loops constitute differentiation circuits while the undirectional elements 24 prevent interaction between the feedback loops and their associated bistable elements.

Although various forms of flip-flops or bistable elements are readily and commercially available, one satisfactory such circuit is shown in FIG. 2. The circuit employs a pair of transistors 25 and 26 which are alternately made to conduct. The circuit is provided, as is typical, with five terminals designated A through E and conform to those of FIG. 1. The reset switch 27 has been illustrated as mechanical but, as is well known, this can be accomplished by a relay or a transistor reset circuit so that after the 100th count all the elements are automatically reset for another count.

Since interference pulses vary in amplitude it is desirable to ascertain the percentage of those pulses which exceed some selected amplitude, for every, say a total of 100 pulses. The Schmitt trigger level is set to this selected value and only those pulses exceeding it will produce an output at the Schmitt trigger output terminal 28 as in FIG. 1. The Schmitt trigger, broadly, is a selector means which in effect passes only those inputs which exceed a selected amplitude. The outputs of the trigger 13 and gate 21 are applied simultaneously to the inputs of "and" circuit 29. The "and" circuit 29, therefore, provides an output pulse for every pulse exceeding the selected amplitude setting of trigger circuit 13 until the 100th pulse which turns the gate 21 "off" and terminates the "and" output. It should be observed that the "and" circuit is essentially a switch whose activity is controlled by the "100" pulse counter through the gate 21. Each output pulse from the "and" circuit is counted by the counter 30 which for the sake of simplicity comprise a counter 31 and a readout 32. Such standard counters with their attendant readouts are sold by various manufactures. Those successively employed include a Hewlett-Packard Standard Counter.

Stated in its simplest terms, the interference meter pulse output is fed to both the 100 pulse counter 12 and the variable Schmitt trigger 13. The 100th pulse cause the counter 12 to turn the gate 21 "off" which in turn cuts off the input to the counter 30, terminating its counting operation. Thus at the end of 100 pulses the counter readout 32 will indicate the percentage of interference pulses above some selected, specified amplitude. Clearly any other total count could be employed. However, the "100" count provides a convenient number which results in a direct percentage indication.

The illustrated embodiment of FIG. 3 is similar to that of FIG. 1 and those blocks which are identical have been designated by the same reference numerals. The difference between the embodiments lie essentially in the fact that the 100 pulse counter has been replaced by the combination of a pulse shaper 31, an integrator 32, and a Schmitt trigger circuit 33. The pulse output of the interference meter or some source of random pulses 34 is simutlaneously applied to variable Schmitt trigger 13 and pulse shaper 31 which causes the input pulse thereto to be converted into pulses having identical width and amplitude parameters. These pulses are fed into the integrator which may comprise an operational amplifier 35 shunted by a feedback capacitor 36 and the series combination of a reset switch 37 and resistor 38. The resulting output voltage from the integrator 32 will be proportional to the total number of pulses applied thereto. The succeeding Schmitt trigger 33 is adjusted so as to trigger off an output pulse when the integrated voltage input to it is equal to 100 pulses at the integrator. The output pulse of trigger 33 will turn gate 21 off and the counter 30 will terminate its count of pulses received from the variable amplititude trigger 13 through "and" circuit 29. It should be noted that the shaper 31, integrator 32 and trigger 33 together constitute a analog counter.

Summarizing the unique operation, the pulse shaping circuit causes all the pulses to have the same weight and width so that integrating them results in a voltage proporitonal to the number or pulses or counts. When 100 pulses are attained the integrated voltage will trigger off the Schmitt circuit which will emit a pulse turning off the gate (normally on) which in turn turns off the input to the counter. The reading or indication of the counter is then the percentage of the pulses above the limit set by the variable level Schmitt trigger.

The embodiment of the invention shown in FIG. 4 employs a pair of integrators one in the counter circuit and the other applying its integrated voltage to a voltmeter. The output of meter 10 is applied to pulse shaper 31 via single pole-double throw switch 39 and simultaneously to variable level Schmitt trigger 13 which in turn feeds another pulse shaper 40. The outputs of both shapers are applied to "and" circuit 41 as well as gate 21. The output of the "and" circuit 41 is fed to the integrator 42 which is identical to that previously described and designated as 32 of FIG. 3. A suitable and satisfactory integrator is one which is described on pages 22–26 of "Pulse and Digital Circuits" by Millman and Taub published by McGraw-Hill, New York. The integrated voltage output of integrator 42 which is proportional to the number pulses emanating from Schmitt trigger 13 is applied directly to a voltage sensitive readout device such as voltmeter 43. The voltmeter may be calibrated directly in percentage so that no further calculations are necessary.

The device as disclosed will indicate the percentage of pulses exceeding a selected amplitude. It is however also desirable to ascertain the frequency or repetition rate of the incoming pulses which exceed the selected amplitude. For this purpose, a multivibrator 44 or oscillator whose frequency or pulse repetition rate is known has been provided. When such a measurement is required switch 39 is thrown so that the output of the multivibrator 44 is applied to the analog counter by way of pulse shaper 31 while the meter 10 input thereto is disconnected. If, as shown, the repetition rate of the multivibrator is 100 p.p.s. gate 21 will turn "and" circuit 41 "off" and terminate the count of pulses from the trigger 13 after exactly one second. The voltmeter 43 therefore will indicate the number of pulses occurring during a period of one second. With a variable frequency or repetition rate multivibrator a wide range of measuring time periods can be handled.

With present computer technology there are available computers which can analyze the measurements made herein as well as controlling the parameters of the device. Such a computer 45 is provided with a plurality of control output lines one of which controls the variable amplitude level response of the Schmitt trigger 13, as by varying the bais voltage thereto or through a stepping relay. The other control line alters the pulse frequency of multivibrator 44 thereby permitting various rates of pulses repetition to be measured. The computer 45 is programmed to vary the trigger level and thus receive as its input the number or proportion of pulses exceeding various amplitude levels. This essentially permits with the repetition rate the quantization of the interference detected and can be directly related to determining the effects thereof on susceptible equipment. This form of automatic analysis increases the overall efficiency and greatly reduces the expenditure of measurement time.

I claim:
1. A device for measuring the proportion of input pulses thereto which exceed in amplitude a selectable level which device comprises:
  a first pulse counter having input and output terminals and providing an output signal after a selected number of input pulses have been applied to said input,
  a variable amplitude selector means for passing therethrough only input pulses exceeding a selected amplitude level,
  a second pulse counter means,
  a controlled switch means having input, output and control terminals for passing inputs therethrough dependent on the state of said control input terminal, and having connected to its input the output of said selector means and having its said control terminal connected to the said output terminal of said first counter, and having its output terminal connected to said second counter,
  input means connected to said input of said first counter and said variable selector means, whereby when a series of pulses are applied to said input means said second counter will indicate the proportion of pulses exceeding a selected amplitude and when said se- lected number of input pulses of said first counter is 100 then said second counter will indicate the percentage of pulses exceeding a selected amplitude.

2. The device according to claim 1 wherein said selector means is a variable level Schmitt trigger circuit.

3. The device according to claim 2 wherein said controlled switch means is a gate circuit normally "on" except when an input pulse is applied to its input and
   an "and" circuit whose inputs are connected to receive the output from said trigger circuit and the output of said gate circuit and having its output connected to said second counter.

4. The device according to claim 3 wherein said first counter includes the series combination of a first pulse shaper having its output connected to
   a voltage integrator means whose output is connected to
   a second Schmitt trigger circuit.

5. The device according to claim 4 wherein said integrator means includes
   an operational amplifier having
   a feedback capacitor connected across its input and output terminals.

6. The device according to claim 5 wherein said second counter means includes in series connection
   an integrator,
   a voltage indicator means, and
   a second pulse shaper connected intermediate said variable Schmitt trigger circuit and said "and" circuit.

7. The device according to claim 6 further including
   a multivibrator,
   a switch connected intermediate the input of said first pulse shaper, said multivibrator and said input means whereby the output of said multivibrator may be selectively applied to said first pulse shaper and the number of pulses pased by said variable Schmitt trigger during a specific elapsed period of time is indicated.

8. The device according to claim 7 further including an analyzing computer having two control line circuits and an input line,
   said control line circuits connected to said multivibrator and said variable Schmitt trigger to control the level of said trigger and the pulse repetition rate of said multivibrator,
   said input line connected to the output of said second counter.

9. The method of ascertaining the proportion of input pulses exceeding a selected level which comprises:
   passing only those input pulses exceeding a selected amplitude level,
   counting said passing pulses,
   counting all said input pulses until a selected total has been reached,
   terminating said counting of said pulses exceeding a selected amplitude level when said selected total of all said input pulses has been reached,
   indicating the count of said passing pulses.

10. The method according to claim 9 further including:
    generating a fixed number of pulse per unit time,
    counting said generated pulses and
    terminating said counting of said pulses exceeding a selected amplitude level when said count of said generated pulses reaches a fixed number,
    whereby the count of said exceeding pulses will be indicative of the repetition rate thereof.

References Cited

UNITED STATES PATENTS

| | | | |
|---|---|---|---|
| 3,214,700 | 10/1965 | Hook | 328—115 |
| 3,317,823 | 5/1967 | Webb | 328—115 |

MAYNARD R. WILBUR, Primary Examiner

J. M. THESZ, Assistant Examiner

U.S. Cl. X.R.

325—42; 328—115